United States Patent
Bell

(10) Patent No.: US 6,883,235 B2
(45) Date of Patent: Apr. 26, 2005

(54) CAST INTEGRAL RING GEAR AND DIFFERENTIAL CASE

(75) Inventor: Dale K. Bell, Ortonville, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 255 days.

(21) Appl. No.: 09/864,064

(22) Filed: May 23, 2001

(65) Prior Publication Data

US 2002/0174740 A1 Nov. 28, 2002

(51) Int. Cl.[7] .................................................. B23P 15/14
(52) U.S. Cl. .................... 29/893.1; 29/893.2; 74/606 R
(58) Field of Search ................... 29/893, 893.1, 29/893.2; 164/98; 74/606 R, 607

(56) References Cited

U.S. PATENT DOCUMENTS

| | | | | |
|---|---|---|---|---|
| 4,512,211 A | * | 4/1985 | Stritzel | |
| 4,620,507 A | * | 11/1986 | Saito et al. | |
| 4,949,456 A | * | 8/1990 | Kovach et al. | |
| 5,056,581 A | * | 10/1991 | Tagawa et al. | ............... 164/98 |
| 6,010,424 A | * | 1/2000 | Irwin | |
| 6,058,794 A | * | 5/2000 | Hempel | |

* cited by examiner

Primary Examiner—David P. Bryant
(74) Attorney, Agent, or Firm—Carlson, Gaskey & Olds

(57) ABSTRACT

An apparatus and method of forming a differential assembly is provided that includes the steps of providing a ring gear, which is preferably produced by a precision forging process. The differential case is cast about a portion of the ring gear to secure the ring gear to the differential case and form the differential assembly. Preferably, the ring gear includes projections that are embedded in the differential case during the casting process to enhance the connection between the ring gear and the differential case. In this manner, the ring gear may be constructed from a forged steel and the differential case may be constructed from ductile iron while eliminating the fasteners of the prior art.

9 Claims, 1 Drawing Sheet

CAST INTEGRAL RING GEAR AND DIFFERENTIAL CASE

BACKGROUND OF THE INVENTION

This invention relates to a differential assembly for use in an axle, and more particularly, the invention relates to a ring gear and differential case used in a differential assembly.

Differential assemblies are commonly used in axles and other rotational transmission devices to provide relative rotation between shafts arranged along a common axis. The differential assembly typically receives rotational input from a drive shaft transverse to the common axis. The rotational input is transmitted through the differential assembly by a ring which is secured to a differential case. The differential case supports the ends of the shafts and the gears necessary to permit relative rotation of the shafts.

The ring gear is typically secured to differential case using numerous bolts, nuts and washers, which add costs and weight to the differential assembly. The ring gear and differential case are manufactured separately and secured to one another, which in part is necessitated by the different materials usually utilized to construct each of the components. The ring gear is typically constructed from a forged steel to withstand the large input forces transmitted through the drive shaft, and the differential case is typically constructed from a ductile iron or cast steel.

One proposed solution to eliminate the fastening components of the prior art was to manufacture the ring gear and differential case as a single unit from forged steel. However, utilizing forged steel for the entire differential assembly may increase the overall weight of the assembly because of the increased density of forged steel as compared to ductile iron. Moreover, forging such a large component increases the cost of the differential assembly. Therefore, what is needed is a method and apparatus of securing the ring gear to the differential case.

SUMMARY OF THE INVENTION AND ADVANTAGES

The present invention provides an apparatus and method of forming a differential assembly which includes the steps of providing a ring gear, which is preferably produced by a precision forging process. The differential case is cast about a portion of the ring gear to secure the ring gear to the differential case and form the differential assembly. Preferably, the ring gear includes projections that are embedded in the differential case during the casting process to enhance the connection between the ring gear and the differential case. In this manner, the ring gear may be constructed from a forged steel and the differential case may be constructed from ductile iron while eliminating the fasteners of the prior art.

Accordingly, the above invention provides a method and apparatus of securing the ring gear to the differential case.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
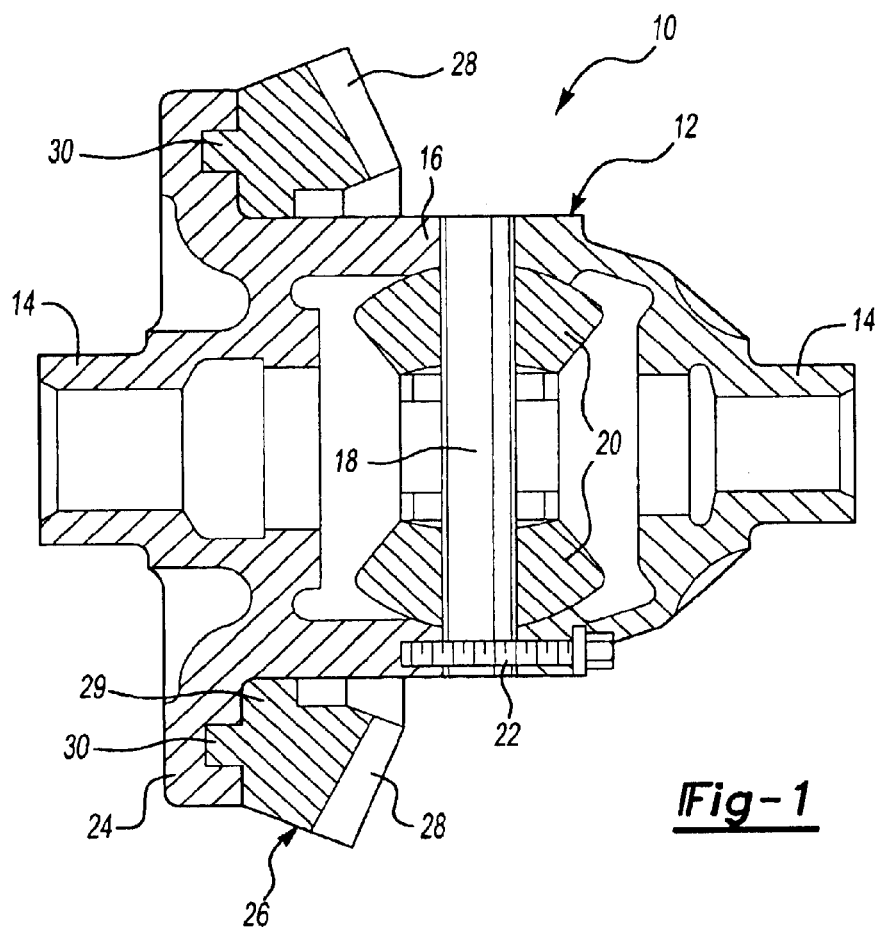
FIG. 1 is a cross-sectional view of a differential assembly according to the present invention.

A differential assembly 10 is shown in FIG. 1. The differential assembly 10 includes a differential case 12, which is preferably constructed from ductile iron. The differential case 12 includes opposing ends 14 that receive and support opposing axle shafts, which are not shown in the Figure. While the differential assembly 10 is discussed with reference to vehicle axles, it is to be understood that the present invention may be utilized for other applications. The differential case 12 includes a central portion 16 having a spider 18 supporting differential pinions 20, which engage side gears on the axle shafts. The differential case shown is a two-piece configuration with fasteners 22 securing the pieces together. However, it is to be understood that the invention may be used for any differential assembly configuration. The spider 18, pinions 20, and fasteners 22 are installed after the casting and machining processes discussed below.

The differential case 12 further includes a flange 24 extending radially from the case 12. In the prior art, a ring gear 26 has been secured to the differential case 12 by fastening the ring gear 26 to the flange 24 utilizing numerous fasteners. The ring gear 26 includes a plurality of teeth 28 which receive rotational input from a drive shaft and pinion, which are not shown. The axle shafts are permitted to rotate relative to one another while receiving rotational input through the ring gear 26, as is well known in the art. The ring gear 26 is preferably constructed from a forged steel to withstand the large forces generated at the gear teeth 28.

According to the present invention, the differential assembly 10 is formed by casting the differential case 12 about a portion of the ring gear 26 to secure the ring gear 26 and differential case 12 to one another. In this manner, the ring gear 26 and differential case 12 may be constructed from dissimilar materials and the fasteners typically used to secure the case and gear to one another may be eliminated. Preferably, the ring gear 26 includes projections 30 extending from the mounting portion 29 of the ring gear. The projections 30 enhance the connections between the ring gear 26 and case 12 and ensure that torque may be effectively transmitted from the ring gear 26 to the differential case 12 without dislodging the gear 26 from the case 12. Most preferably, the flange 24 is cast about the projections 30, which are opposite the teeth 28. In addition to or instead of the utilizing projections 30 extending from the rear of the gear 26 as shown, projections 30 may also extend from the inner diameter of the ring gear 26, or any other suitable location.

Figure 2:
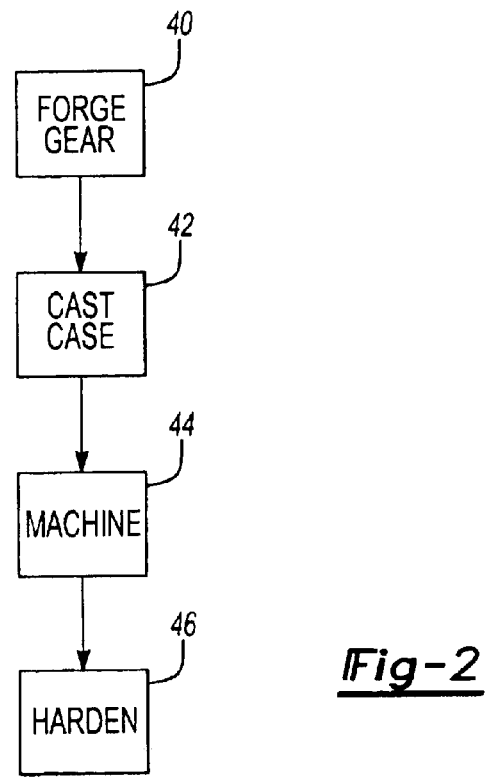
FIG. 2 is a flow chart of a process that may be used to manufacture the differential assembly of the present invention.

A process that may be used to manufacture the differential assembly 10 of the present invention is depicted in FIG. 2. The ring gear is formed, as indicated at 40. The ring gear may be formed by any suitable process, but is preferably formed by a precision forging process that yields a near-net-shape ring gear, which requires a reduced amount of machining as compared to other forging processes. The ring gear is forged from a suitable material such as forging steels known in the art. The forged ring gear may then be inserted into a mold to cast integral with the differential case 12, as indicated at 42. The differential case may be cast from a ductile iron and is cast about a portion of the ring gear such as the projections 30. The teeth on the ring gear and other features of the ring gear and differential case may be machined, as indicated at 44. Preferably, the case 12 is machined prior to the gear 26 so that the gear 26 may be machined with reference to machined features on the case

12. The teeth may then be hardened, as indicated at 46, utilizing an induction hardening or other suitable process, as is known in the art.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A method of forming a differential assembly comprising the steps of:
   a) providing a ring gear; and
   b) casting a differential case around a portion of the ring gear to form the differential assembly.

2. The method according to claim 1, wherein step a) includes forging the ring gear.

3. The method according to claim 2, wherein step a) includes precision forging the ring gear to a near-net-shape.

4. The method according to claim 1, wherein the ring gear is steel.

5. The method according to claim 1, wherein the portion includes projections for an improved connection between the ring gear and the differential case.

6. The method according to claim 5, wherein the differential case is ductile iron.

7. The method according to claim 1, further including the step of:
   c) machining differential case features subsequent to preforming step b).

8. The method according to claim 7, further including the step of:
   d) machining gear teeth on the ring gear subsequent to preforming step c).

9. The method according to claim 8, further including the step of:
   e) induction hardening the gear teeth subsequent to preforming step d).

* * * * *